March 15, 1927.

I. A. ROMMER 1,621,434

DOLL'S LIMB

Filed Feb. 1, 1926

WITNESSES

INVENTOR
Isaac A. Rommer
BY
ATTORNEYS

Patented Mar. 15, 1927.

1,621,434

UNITED STATES PATENT OFFICE.

ISAAC A. ROMMER, OF BROOKLYN, NEW YORK.

DOLL'S LIMB.

Application filed February 1, 1926. Serial No. 85,306.

My invention relates to a means and method for securing a doll's hand to the arm. A doll's hand is made in practice with an integral tubular arm part which in the usual practice said integral arm part is formed with an external annular groove and the fabric material pertaining to the upper arm part or stump is disposed over the grooved rear end of the tubular arm part on the hand and a tie cord, thread, or wire is wound about the said tubular arm part at the groove, thereby binding the fabric after which the fabric is reversed.

The general object of my invention is to provide for affixing the tubular arm part pertaining to the hand to the material of the fixed arm part without wrapping or winding cord or the like about the same and whereby also to economize time and labor in securing the hand to the permanent arm part and at the same time to effect a secure fastening of the hand in position as well as produce a neat finished product.

Reference is to be had to the accompanying drawings forming a part of this specification, it being understood that the drawings are merely illustrative of one example of the invention.

Figure 1:
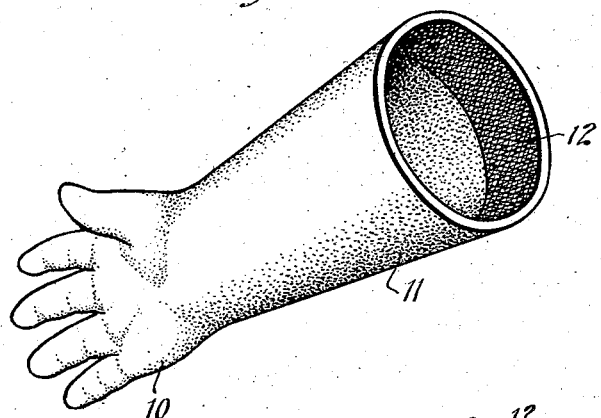
Figure 1 is a perspective view of a hand with an integral arm part thereon.
Figure 2:
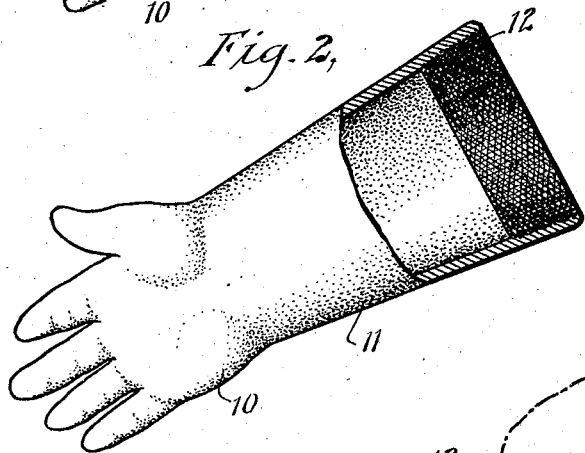
Figure 2 is a side elevation of said hand and tubular arm part with a portion on said arm part in section.

In the illustrated example of my invention the numeral 10 indicates a doll's hand; and 11, a tubular arm part integral therewith.

In accordance with my invention, I employ a zone 12 of fabric within the tubular part 11 at the hear end and I vulcanize the outer face of said fabric to the rubber composing the arm part 11. The inner surface of the fabric 12 exposed at the interior of the part 11 is not rubberized but presents its natural surface. Said natural surface, presented by the zone of fabric 12, readily takes glue, whereas glue will not properly adhere directly to the rubber material. I am therefore enabled by inserting the material of the upper arm part 13 or stump within said tubular part 11 pertaining to hand 10, to effect a firm connection between the two arm parts by a layer of glue applied to the surface of the fabric 12 which will readily adhere to the material of the upper arm part 13.

Figure 3:
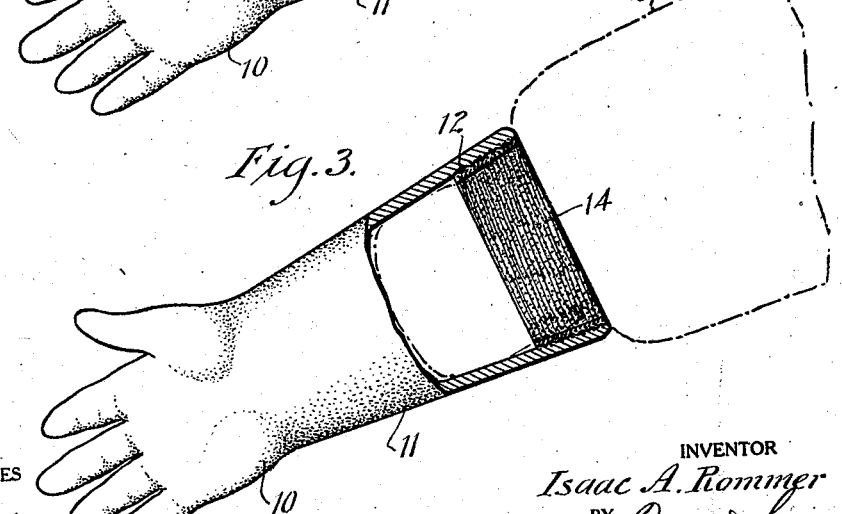
Figure 3 is a view similar to Figure 2 but showing the position of the hand and its integral tubular arm part as secured in position to the upper arm part or stump.

The layer of glue is shown clearly in Figure 3 and indicated by the numeral 14.

Having thus described my invention, I claim:

1. A doll's hand having a tubular part of hard rubber carrying said hand; together with a fabric lining in said tubular part at the rear end, said fabric having its outer surface vulcanized to the inner surface of the rubber material of said tubular part, the inner surface of said fabric being non-rubberized to take an adhesive material for securing the hand to the arm part.

2. A doll's hand having a tubular part of rubber carrying said hand; together with a fabric lining in said tubular part at the rear end, said fabric having its outer surface vulcanized to the inner surface of the rubber material of said tubular part, and an upper arm glued to said fabric.

3. A doll's hand having a part formed of hard rubber appurtenant to the hand at the read end; together with a fabric material applied to a lateral surface of said hard rubber part, said fabric having its opposed surface vulcanized to said lateral surface of the hard rubber material of said part, the exposed surface of said fabric being non-rubberized and adapted to absorb an adhesive to secure the hand to an arm part.

ISAAC A. ROMMER.